United States Patent
Xu et al.

(10) Patent No.: US 8,862,555 B1
(45) Date of Patent: Oct. 14, 2014

(54) METHODS AND APPARATUS FOR GENERATING DIFFERENCE FILES

(75) Inventors: Qiuer Xu, Jiangsu (CN); Jinju Long, Jiangsu (CN); Liwei Ren, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 530 days.

(21) Appl. No.: 13/108,511

(22) Filed: May 16, 2011

(51) Int. Cl.
*G06F 17/30* (2006.01)

(52) U.S. Cl.
USPC .................................. 707/687; 707/E17.005

(58) Field of Classification Search
CPC ... G06Q 20/20; G06Q 20/201; G06Q 20/203; G06Q 20/206; G06Q 30/02; G06F 11/3676; G06F 8/47; G06F 21/10
See application file for complete search history.

(56) References Cited

U.S. PATENT DOCUMENTS

| | | | |
|---|---|---|---|
| 5,832,520 A | 11/1998 | Miller | |
| 6,233,589 B1 | 5/2001 | Balcha et al. | |
| 6,535,894 B1 | 3/2003 | Schmidt et al. | |
| 7,861,224 B2 * | 12/2010 | Petrov et al. | 717/122 |
| 8,176,018 B1 * | 5/2012 | Bisson et al. | 707/690 |
| 2007/0016629 A1 * | 1/2007 | Reinsch | 707/203 |
| 2007/0047457 A1 * | 3/2007 | Harijono et al. | 370/250 |

OTHER PUBLICATIONS

Purushottam Kulkarni Title: "Redundancy Elimination Within Large Collections of Files", USENX 2004 annual conference. Dated 2004. https://gnunet.org/sites/default/files/10.1.1.91.8331.pdf.*

* cited by examiner

*Primary Examiner* — Anteneh Girma
(74) *Attorney, Agent, or Firm* — Okamoto & Benedicto LLP

(57) ABSTRACT

One embodiment relates to a computer-implemented method for generating difference data between reference and target files. A difference engine performs a first procedure to generate difference data representing the difference between the reference and target files if the reference and target files are sequences of sorted data records. The first procedure may compare a lexical order of a record from the reference file against a lexical order of a record from the target file. An entry may be added to a copy list if the records are the same, and an entry may be added to an add list if that the record from the reference file is lexically greater than the record from the target file. Another embodiment relates to an apparatus for generating difference data.

30 Claims, 8 Drawing Sheets

COPY-list

[Reference address and length of record with lexical order # 1]

[Reference address and length of record with lexical order # 3]

[Reference address and length of record with lexical order # 5]

[Reference address and length of record with lexical order # 6]

[Reference address and length of record with lexical order # 9]

ADD-list

[Target record data and length of record with lexical order # 2]

[Target record data and length of record with lexical order # 7]

*FIG. 6B*

METHODS AND APPARATUS FOR GENERATING DIFFERENCE FILES

BACKGROUND

1. Field of the Invention

The present invention relates generally to methods and apparatus for differential compression for incremental file updates and other applications.

2. Description of the Background Art

A problem in the field of computing is the need to update computer files on various disparate computers. The updating may be done, for example, by downloading a complete new version of the file or by an incremental update in which modifying data (i.e., the difference) for modifying the existing file to form the updated version is downloaded. For example, a software update may be required because the program has altered in response to the occurrence of bugs within the program or to add additional functionality to a program.

In another example, frequent computer file updates may be needed when the computer file represents rapidly evolving data needed by the computer. For instance, anti-virus computer programs generally utilize computer virus definition (signature) data which needs to be updated frequently to provide protection against new viruses. In addition, data leakage prevention programs use document fingerprints which also need to be updated.

It is highly desirable to improve techniques which facilitate differential compression for incremental file updates and other applications.

SUMMARY

One embodiment relates to a computer-implemented method for generating difference data between reference and target files. Both reference and target files are structured files as sequences of data records sorted according to a same lexical ordering. A difference engine performs a first procedure to generate the difference. The first procedure may compare a lexical order of a record from the reference file against a lexical order of a record from the target file. An entry may be added to a copy list if the records are equal, and an entry may be added to an add list if that the lexical order of the record from the reference file is greater than the lexical order of the record from the target file.

Another embodiment relates to an apparatus for generating difference data. The apparatus includes computer-readable instruction code configured to perform the first procedure.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 6B depicts copy and add lists generated for the example reference and target files of FIG. 6A in accordance with an embodiment of the invention.

DETAILED DESCRIPTION

Example Computer

Figure 1:
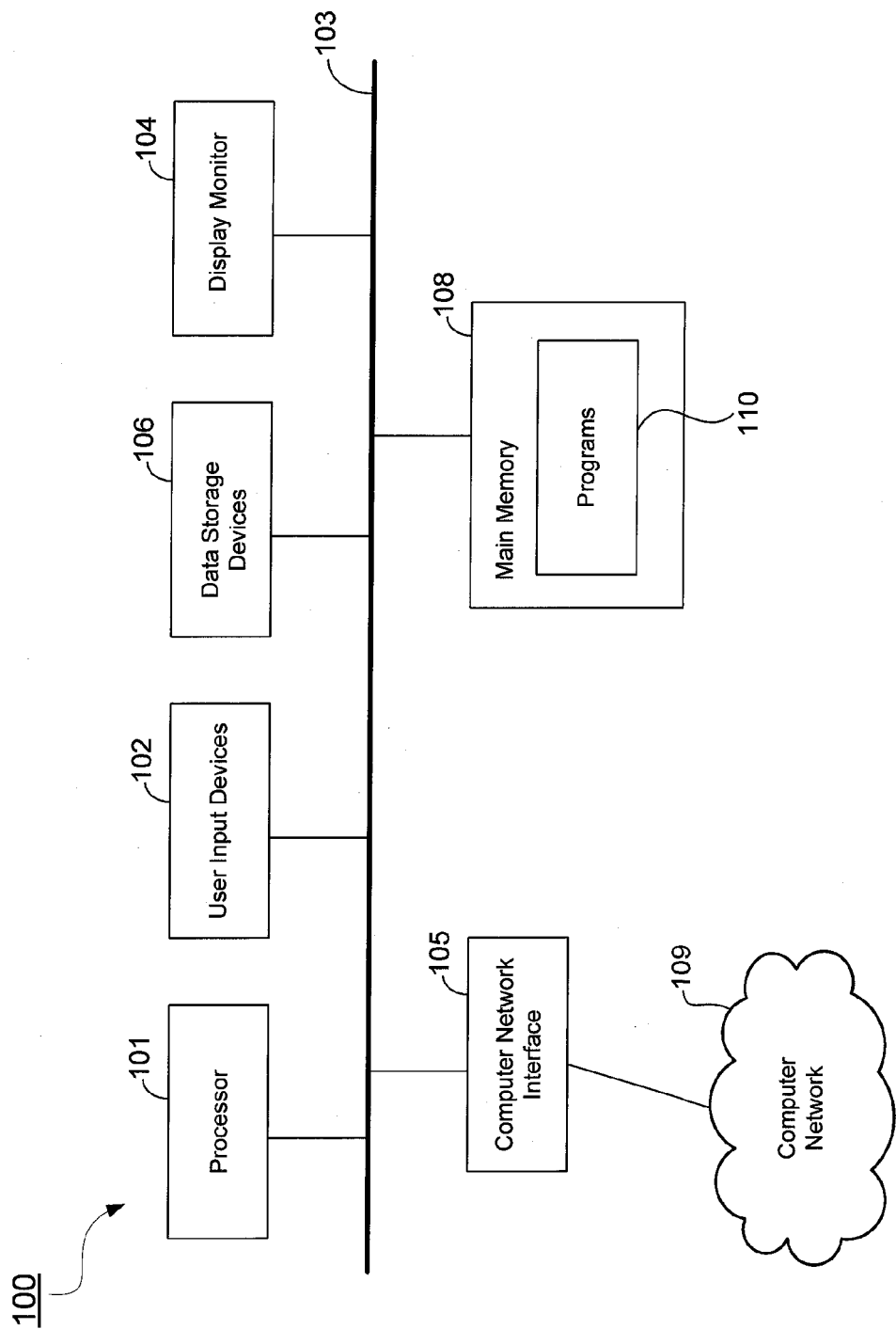
FIG. 1 is a schematic diagram of an example computer that may be used in embodiments of the present invention.

Referring to FIG. 1, there is shown a schematic diagram of an example computer that may be used in embodiments of the present invention. The computer shown in the example of FIG. 1 may be employed as a client computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse, etc.), a display monitor 104 (e.g., LCD, cathode ray tube, flat panel display, etc.), a computer network or communications interface 105 (e.g., network adapters, wireless network adapters, etc.) for communicating over a computer (data) network 109, one or more data storage devices 106 (e.g., hard disk drive, optical drive, FLASH memory, etc.) for storing computer-readable data onto computer-readable media and for reading the data therefrom, and a main memory 108 (e.g., DRAM, SRAM, etc.).

Computer-readable data (including computer-readable program instructions) may be stored in the data storage devices 106 and may be loaded into main memory 108. Computer-readable data may also be received over the computer network 109 by way of a communications interface 105. In particular, the main memory 108 may loaded with programs 110 (comprising computer-readable instruction code and data) which may be executed by the processor 101 to perform some of the functionalities and operations as described herein.

Difference Engine Framework

In general, difference (diff) technology includes a difference engine and a merge engine. The difference engine generates the difference between two files. These two files are referred as a reference file R and a target file T, respectively. The difference generated may be referred to as a diff file (or delta file) which may be presented as $\delta = T - R$. The merge engine merges the reference file with the diff file to reconstruct the target file. In this case, the target file may be presented as $T = R + \delta$.

Figure 2A:
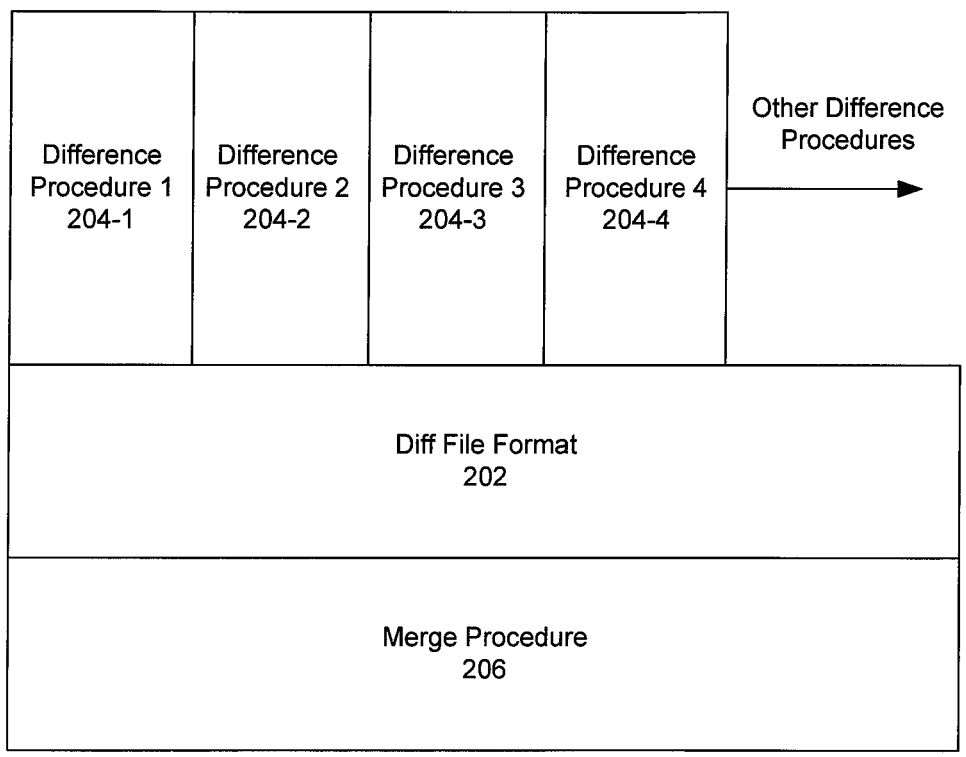
FIG. 2A is a schematic diagram depicting an extensible framework for a difference engine in accordance with an embodiment of the invention.

FIG. 2A is a schematic diagram depicting an extensible framework for a difference engine 200 in accordance with an embodiment of the invention. As shown, the framework of the difference engine is built using a common file format for the difference files (diff file format) 202. An example format or structure for a difference file is described below in relation to FIG. 4.

As shown, multiple computer-implemented difference procedures 204 may be provided to generate difference files in the diff file format 202. In a particular embodiment disclosed in detail herein, four difference procedures (204-1, 204-2, 204-3, and 204-4) may be provided.

In accordance with an embodiment of the invention, the difference engine may be configured with a computer-implemented procedure-selection method to select, given a pair of input files, which particular difference procedure 204 is to be applied. The difference procedure to be applied may depend on pre-determined characteristics of the input files. An example procedure-selection method is described below in relation to FIG. 5.

In addition, in this framework, a single merge procedure 206 may be provided to utilize the difference files generated by the various difference procedures 204. In other words, the merge procedure 206 is advantageously independent of the difference procedure.

Figure 2B:
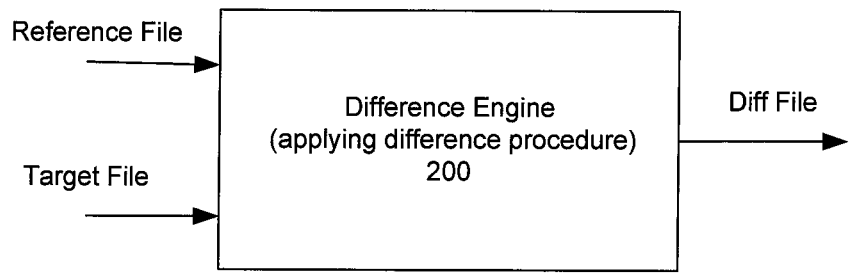
FIG. 2B is a schematic diagram showing inputs and outputs of a difference engine configured to apply a difference procedure in accordance with an embodiment of the invention.
Figure 2C:
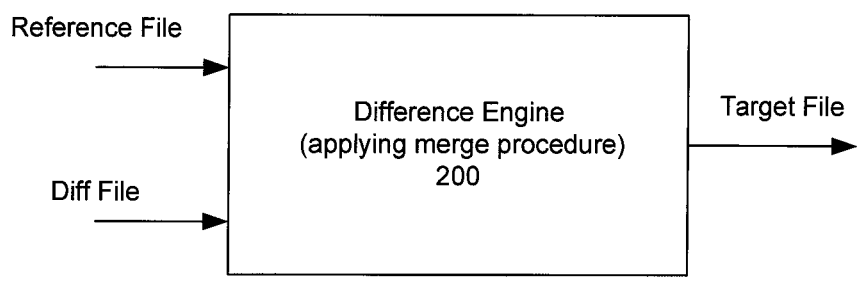
FIG. 2C is a schematic diagram showing inputs and outputs of a difference engine configured to apply a merge procedure in accordance with an embodiment of the invention.

FIG. 2B is a schematic diagram showing inputs and outputs of a difference engine 200 configured to apply a difference procedure in accordance with an embodiment of the invention. In this case, the difference engine 200 receives a reference file and a target file. The difference engine 200 processes these files to generate a difference (diff) file FIG. 2C is a schematic diagram showing inputs and outputs of a difference engine 200 configured to apply a merge procedure in accordance with an embodiment of the invention. In other words, the difference engine 200 in FIG. 2C is configured to function as a merge engine. In this case, the difference engine 200 receives a reference file and a diff file. The difference engine 200 processes these files to regenerate the target file.

Figure 3:
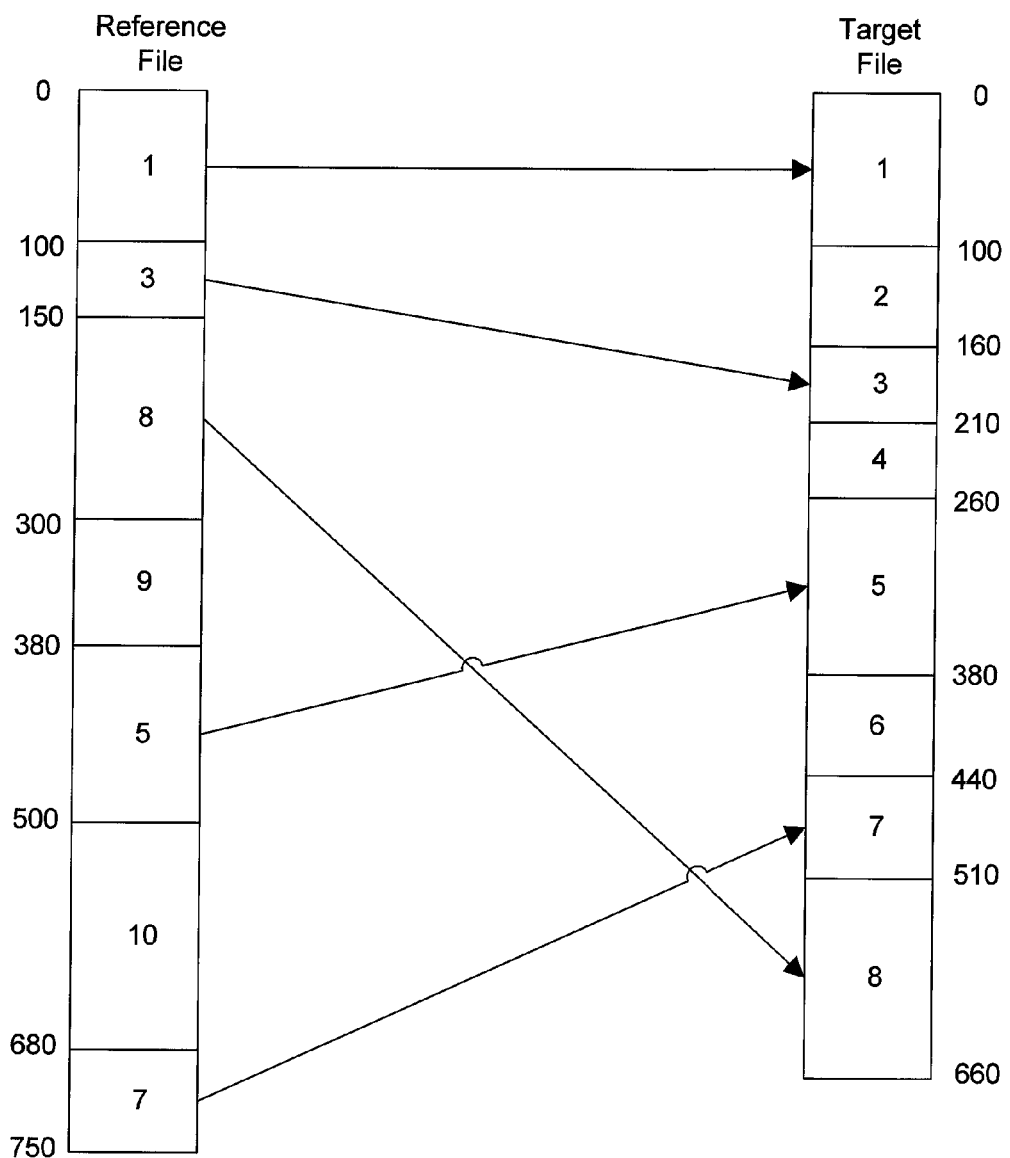
FIG. 3 is a schematic diagram showing example reference and target files and a copy/add based diff model.

FIG. 3 is a schematic diagram showing example reference and target files and a copy/add based diff model. A representation of a reference file is shown on the left, and a representation of a target file is shown on the right. Sections (or blocks) of the reference and target files that are the same are labeled with the same number.

In the illustrated example, assume the block sizes in the figure are as follows.

Block 1 has 100 bytes
Block 2 has 60 bytes
Block 3 has 50 bytes
Block 4 has 50 bytes
Block 5 has 120 bytes
Block 6 has 60 bytes
Block 7 has 70 bytes
Block 8 has 150 bytes
Block 9 has 80 bytes
Block 10 has 180 bytes This diff model defines difference data as a sequence of COPY/ADD string edit operations that reconstruct the target file from the reference file. After a sequence of COPY/ADD operations is identified (for example, in a diff or delta file), the sequence of operations should be encoded in an efficient manner: For example, the sequence of edit operations may be formed in the order of ascending addresses of target blocks for encoding efficiency. A copy operation may be encoded as <src_address, length>, where src_address is the offset distance of the copied block within the reference file, and the length is the block size. An ADD operation is encoded as <data, length>, where data is the data block being added to the target file, and the length is the block size. Using these definitions, the example shown in FIG. 3 has a difference that may be represented by the following sequence of eight edit (copy or add) operations:

1. COPY <0,100>
2. ADD <block 2,60>
3. COPY <100,50>
4. ADD <block 4,50>
5. COPY <380,120>
6. ADD <block 6,60>
7. COPY <680,70>
8. COPY <150,150>

While the above sequence uses the aforementioned definitions of the COPY and ADD functions, an alternate definition which provides additional clarity and detail is as follows. COPY <dest_address, src_address, length>, where dest_address is the offset of the copied block within the target file, src_address is the offset of the copied block within the reference file, and length is the length of the copied block. ADD <dest_address, data, length>, where dest_address is the offset of the copied block within the target file, data is the data block to be added to the target file, and length is the size of the block being added. Using these alternate definitions, the sequence of eight operations may be given as follows.

1. COPY <0,0,100>
2. ADD <100,block 2,60>
3. COPY <160,100,50>
4. ADD <210,block 4,50>
5. COPY <260,380,120>
6. ADD <380,block 6,60>
7. COPY <,440,680,70>
8. COPY <510,150,150>

A difference (diff or delta) file contains information or instructions on how to reconstruct the target file from the reference file. The diff file generated by a difference engine generally includes a sequence of edit operations, such as the COPY and ADD functions described above (or, alternatively, INSERT and DELETE string edit operations when used with a largest common subsequence technique). An efficient (i.e. good compression rate) diff engine generates a diff file with a greater number of COPY, rather than ADD, operations. In other words, under the COPY/ADD model, an efficient diff algorithm is good at identifying portions to copy from the reference to the target file. (Under the INSERT/DELETE model, an efficient diff algorithm is good at minimizing the portions inserted into the reference file). In accordance with an embodiment of the invention, the difference engine uses the COPY/ADD model (i.e. generates difference data including COPY and ADD instructions).

The sequence of edit operations (the diff data) may be encoded by the difference engine into a single file. This file may be referred to as a diff file (or delta file) which provides the information needed by a merge engine to reconstruct the target file (using the reference file). There are many formats for encoding the sequence of edit operations.

Figure 4:
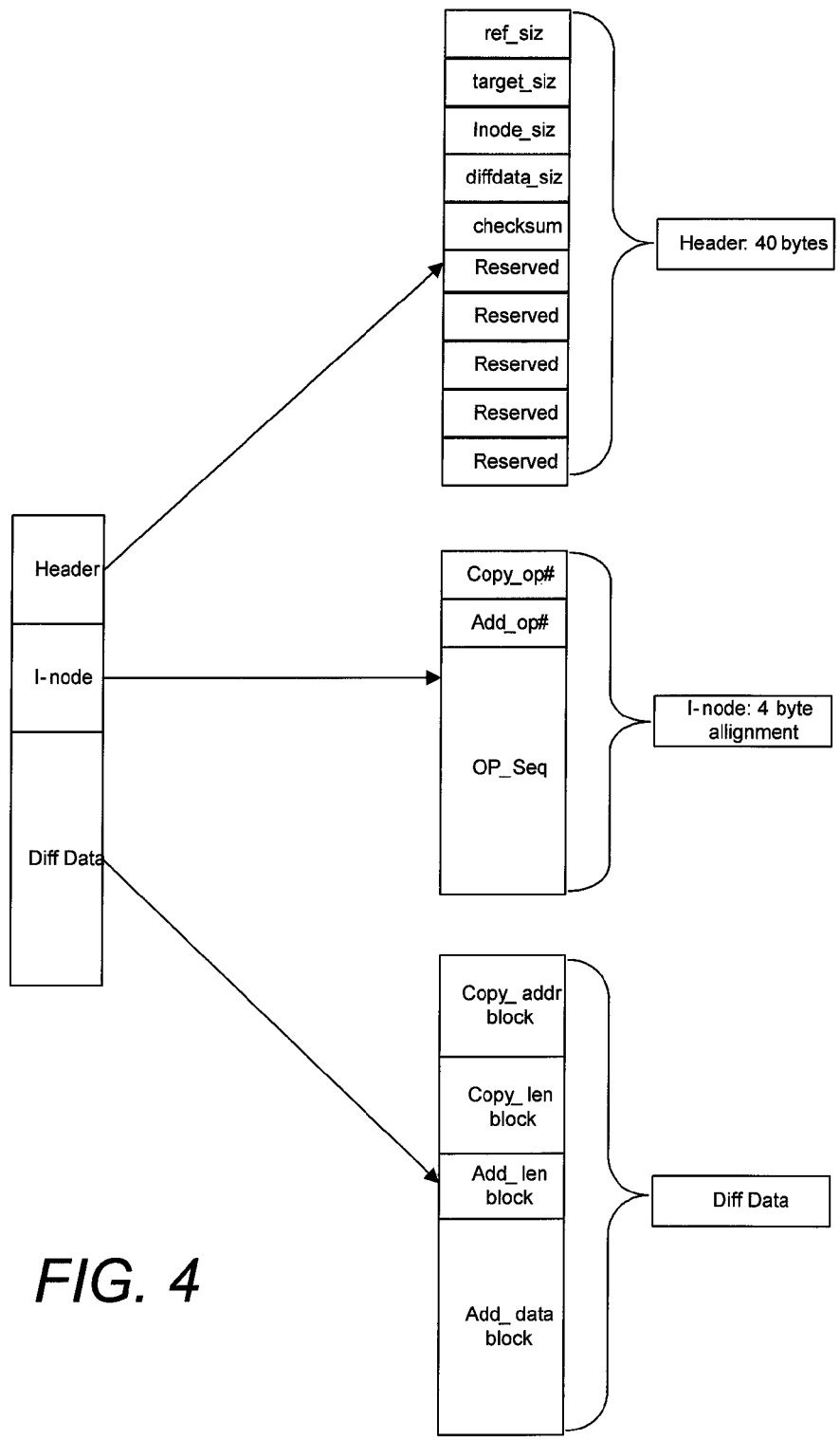
FIG. 4 is a schematic diagram showing an example structure for a difference file.

An example format of a diff (or delta) file is shown in FIG. 4 for illustrative purposes. The format is shown as having three sections: a Header, an I-node section, and a Diff Data section. In this example, the Header includes the metadata for the file. In this particular case, the header may be forty bytes in length, the reference file size (ref_siz), the target file size (target_siz), the I-node size (Inode_siz), the diff data size (diffdata_siz), the checksum (over the I-node and Diff Data), and the five Reserved data fields (for alignment) may each be four bytes in length. Other header formats may be used.

The I-node includes metadata for the edit operations and may be of varied size. A number of COPY operations (Copy_op#) and a number of ADD operations (Add_op#) may be given in fields which are four bytes in length. The sequence of edit operations (Op_seq) indicates whether each operation in the sequence is a COPY or an ADD. For example, each operation may be represented by one bit, where the bit is one for COPY and zero for ADD.

The Diff Data gives the specific edit operation data and may also be of varied size. The sequence of COPY addresses may be given together, in order, as a single block of data (Copy_addr block), where each COPY address is four bytes in length. The sequence of COPY lengths may also be given together, in order, as a single block of data (Copy_len block), where each COPY length is four bytes long. Similarly, the sequence of ADD lengths may be given together, in order, as a single block of data (Add_len block), where each ADD length is four bytes long. Finally, the sequence of ADD data may be given together, in order, as a single block of data (Add_data block).

Problems and Inefficiencies with Conventional Difference Procedures

One problem with conventional difference engines is that, while they may have good compression rates, they typically have difficulty handling files of large sizes. This is primarily due to fact that the memory requirements of the conventional procedures or algorithms grows rapidly with increasing file size. For example, applicants estimate that a conventional difference engine implemented on a 32-bit computer with 512 MB (megabytes) memory may reasonably handle file sizes of less than 64 MB due to memory limitations. Conventional difference engines are particularly inefficient in handling well-structured files of extremely large file sizes (for example, of a scale of more than several GB).

For example, the conventional difference engine referred to as "xdelta" utilizes an algorithm which can handle relatively large file sizes, such as a 1 GB file. However, the xdelta difference engine has a rather poor compression rate which results in a larger size of the resultant difference data. The xdelta difference engine is also inefficient in handling well-structured files of extremely large file sizes.

Efficient Difference Procedures and a Procedure-Selection Method

Figure 5:
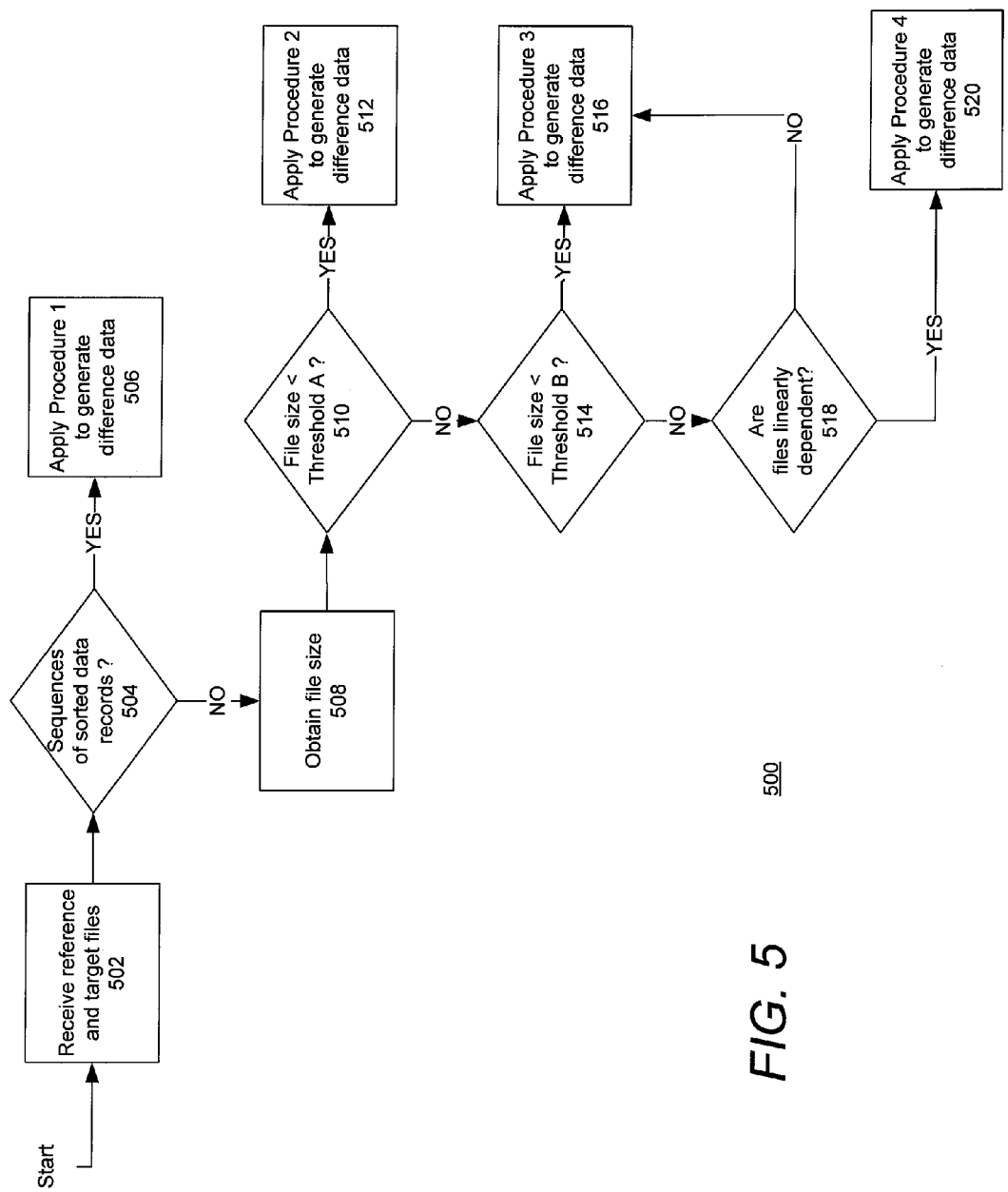
FIG. 5 is a flow chart showing a method of generating a difference file in accordance with an embodiment of the invention.

FIG. 5 is a flow chart showing a method 500 of generating a difference file in accordance with an embodiment of the invention. As shown, this method 500 involves selecting between multiple difference procedures depending on one or more characteristics of the input files. In particular, as described below, the difference procedure applied may depend on whether or not the input files are sorted and on the file sizes.

As shown, the method 500 may begin by receiving 502 a reference file and a target file. A determination 504 may then be made as to whether or not the reference and target files are sequences of data records which are sorted according to a same lexical ordering ("sequences of sorted data records").

In accordance with an embodiment of the invention, the reference and target files that are received 502 may be determined 504 to be sequences of sorted data records. For example, the data records in both files may be ordered in alphabetical order based on data in a name field. For records with the exact same name, the lexical ordering may specify that those records are to be ordered, in relation to each other, in numerical order based on data in an account number field.

If the reference and target files are sorted sequences of data records, then a first procedure (Procedure 1) is applied 506 by the difference engine to generate the difference data between reference and target files. An exemplary first procedure is described below in reference to Table 1.

If the files are not sorted sequences of data records, then the size of one of the files may be obtained 508. In particular, under the Copy/Add model, the size of the reference file may be obtained. This is because the size of a hash table needed depends on the size of the reference file under the Copy/Add model. The hash table consumes memory. This file size is used subsequently to determine which procedure to apply.

If the file size is determined 510 to be less than a first threshold size (Threshold A), then a second procedure (Procedure 2) is applied 512 by the difference engine to generate the difference data between reference and target files. An exemplary second procedure is described below in reference to Table 2. For example, if Procedure 2 is implemented on a 32-bit computer with 512 MB memory, then Threshold A may be sixty-four megabytes (64 MB).

If the file size is determined 514 to be less than a second threshold size (Threshold B), then a third procedure (Procedure 3) is applied 516 by the difference engine to generate the difference data between reference and target files. An exemplary third procedure is described below in reference to Table 3. For example, if Procedure 3 is implemented on a 32-bit computer with 512 MB memory, then Threshold B may be one gigabyte (1 GB). Otherwise, if the file size is determined 514 to be greater than the second threshold size (Threshold B), then a determination 518 may be made as to whether the reference and target files are linearly dependent.

If the files are determined 518 to be linearly dependent, then a fourth procedure (Procedure 4) is applied 520 by the difference engine to generate the difference data between reference and target files. An exemplary fourth procedure is described below in reference to Table 4. Otherwise, if the files are determined 518 to not be linearly dependent, then Procedure 3 (or another alternate procedure) may be applied 516 (although that procedure may be relatively slow in generating the diff data).

First Procedure (Procedure 1)

In accordance with an embodiment of the invention, if the reference and target files are sorted in a same manner, then a first procedure (Procedure 1) is applied by the difference engine to generate the difference data between reference and target files. An exemplary first procedure is described below in reference to Table 1.

The first procedure is advantageously configured to generate the difference data between reference and target files

TABLE 1

Input: Reference file R having N reference records R_R; a reference sorted-value array R_S that holds the sizes of all the reference records R_R; Target file T having M target records T_R; and a target size array T_S that holds the sizes of all the target records T_R.
Output: Compressed diff file
Procedure:
1. Get the N reference records R_R from reference file R in lexical order; and get the M target records T_R from target file T in lexical order.
2. Initialize COPY-list and ADD-list; let i = 0 and j = 0
3. If R_R[i] == T_R[j]
    Add reference address and length of R_R[i] into COPY-list and let
      i = i + 1, j = j + 1
    Else if R_R[i] < T_R[j], let i = i + 1
    Else if R_R[i] > T_R[j], add target record data and length of T_R[j]
      into ADD-list and let j = j + 1
4. If i < N and j < M, go to step 3
5. If j < M, add remain target data and length from T_R[j] into ADD-List
6. Modify the COPY-list and ADD-list as instructed below, and then generate the sequence S:
    a. Size of S = Size of ADD-list + Size of COPY-list
    b. Values of S indicate COPY or ADD for the corresponding record TABLE 1-continued 7. Compute checksum; pack checksum, S, COPY-list and ADD-list into one diff file.
8. Apply compression algorithm/tool to diff file Note: The step 6 may include the enhancement of modifying both COPY-list and ADD-list prior to generating the S sequence. The modifications merge consecutive COPYs into a single COPY and consecutive ADDs into a single ADD. For example, the modifications may be implemented as follows.

1. For the COPY-list as {<dest_address[k], src_address[k], length[k]>1≤k≤K}, if src_address[k]+length[k]=src_address[k+1], ..., src_address[k+m−1]+length[k+m−1]=src_address[k+m], we can merge the m+1 COPYs into one COPY operation as <dest_address[k], src_address[k], length[k]+ ... +length[k+m]>.
2. For the ADD-list as {<dest_address[k], data[k], length[k]>, 1≤k≤K}, if dest_address[k]+length[k]=dest_address[k+1], ..., dest_address[k+m−1]+length[k+m−1]=dest_address[k+m], we can merge the m+1 ADDs into one ADD operation as <dest_address[k], concatenating <data[k], data[k+1], ..., data[k+m]>, length[k]+ ... +length[k+m]>.

The above procedure basically has two stages or groups of steps. A first stage of the procedure involves identifying copy/add operations with incremental sequences of sorted records in the reference and target files. The first stage corresponds to steps 1 through 5. A second stage involves packing and encoding the difference file. The second stage includes steps 6 through 8.

First Stage of Procedure 1

Per Procedure 1, the inputs include reference file R having N reference records R_R in lexical order; a reference size array R_S that holds the sizes of all the reference records R_R; Target file T having M target records T_R in lexical order; and a target size array T_S that holds sizes of all the target records T_S. The first stage of Procedure 1 begins with step 1.

In step 1, the procedure gets the N reference records R_R in lexical order from reference file R (having sizes given in the reference size array R_S) and also gets the M target records T_R in lexical order from target file T (having sizes given in the target size array T_S). Note that, in one implementation, all these records are loaded into memory of a computer apparatus. In another implementation, if memory is not large enough, then subsets of these records may be loaded into memory (for example, on an as needed basis) without affecting the operability of the procedure.

Per step 2, a COPY-list and an ADD-list are initialized. The COPY-list is to include a list of records which are to be copied from the reference file R to the target file T in a subsequent merge procedure. The ADD-list is to include a list of records which are not in the reference file R and are to be added to (inserted into) the target file T in a subsequent merge procedure. In addition, number variables i and j may be set to an initial value, which is zero in this example. The number variable i is used to point to a record in the reference file, while the number variable j is used to point to a record in the target file.

Per step 3, a comparison is made between the i-th record in the reference file (which is represented by the array value R_R[i]) and the j-th record in the target file (which is represented by the array value T_R[j]). The subsequent action depends on the result of this comparison.

If the i-th record in the reference file is the same as the j-th record in the target file (i.e. R_R[i]==T_R[j]), then an entry with the reference address and length (size) given by R_S[i] is added to the COPY-list. Thereafter, both i and j are incremented. The procedure then goes to step 4.

If the i-th record in the reference file is lexically less than the j-th record in the target file (i.e. R_R[i]<T_R[j]), then i is incremented (while j remains the same). A first record is lexically less than a second record if the first record is lower (earlier) in the lexical ordering. No entry is added to either the COPY-list or the ADD-list. The procedure then goes to step 4.

If the i-th record in the reference file is lexically greater than the j-th record in the target file (i.e. R_R[i]>T_R[j]), then an entry with the target record data and length (size) given by T_S[j] is added to the ADD-list. A first record is lexically greater than a second record if the first record is higher (later) in the lexical ordering. Thereafter, j is incremented (while i remains the same). The procedure then goes to step 4.

Per step 4, if i<N and j<M, then the procedure loops back to step 3. Otherwise (if either i=N or j=M), the procedure continues to step 5.

Per step 5, if j<M, then entries with the remaining target record data and the record lengths (sizes) given by T_S[j] (from the current value of j up to j=M) are added to the ADD-list. After step 5, the first stage of Procedure 1 is complete.

Second Stage of Procedure 1

The second stage of Procedure 1 begins with step 6. Per step 6, a sequence S is generated. The size or length of S is given by the sum of the number of entries in the ADD-list and the number of entries in the COPY-list (i.e. the size of the ADD-list plus the size of the COPY-list). Each value (entry) in sequence S indicates whether the corresponding record in the target file is to be copied using the COPY-list or added from the ADD-list. For example, a value of one may indicate that the corresponding record is to be copied from the reference file as indicated by the COPY-list, while a value of zero may indicate that the corresponding record is to be added from the ADD-list. Using ones and zeroes results in a compact size for the sequence S in that eight COPY or ADD instructions may be represented by a single byte (8 bits).

Per step 7, a checksum may be computed. The checksum may be over the sequence S, the COPY-list, and the ADD-list. The checksum, sequence S, COPY-list, and ADD-list may then be packed into a single diff (difference) file. Finally, in step 8, digital compression may be applied to reduce the size of the diff file.

Example of Procedure 1

Figure 6A:
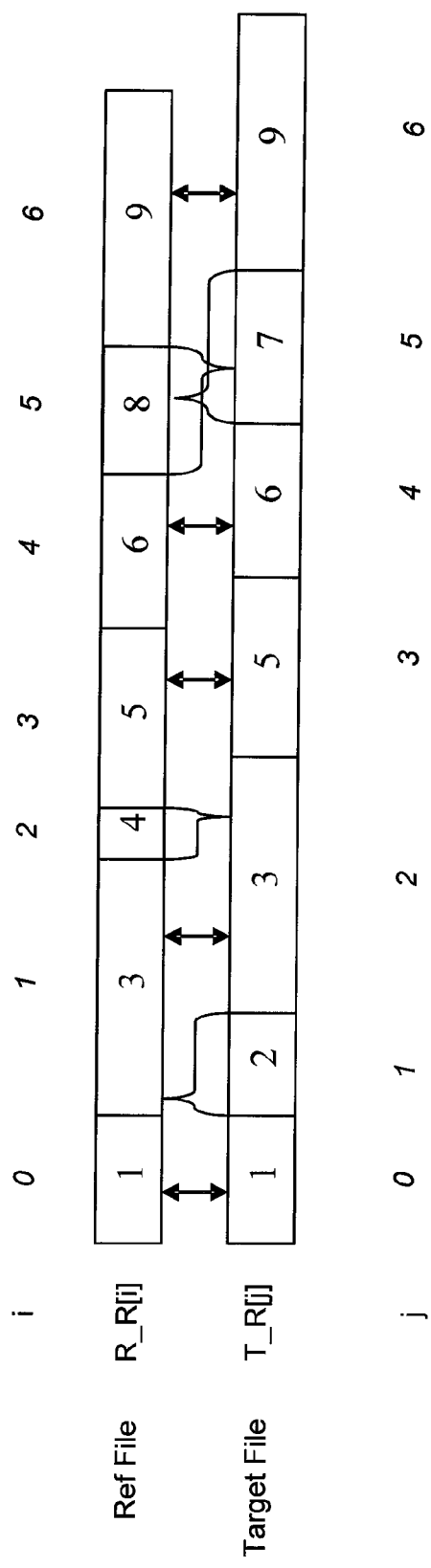
FIG. 6A depicts example reference and target files for discussing a procedure for generating a difference file between well-structured files in accordance with an embodiment of the invention.

An example application of Procedure 1 is now described in relation to the example reference and target files depicted in FIG. 6A. In FIG. 6A, the reference file (Ref File) and the target file (Target File) are schematically depicted with numbers representing the lexical order of the records from left to right in the drawing. In this example, the Ref File includes records with lexical order numbers in the following sequence: 1, 3, 4, 5, 6, 8, and 9. Meanwhile, the Target File includes records with lexical order values in the following sequence: 1, 2, 3, 5, 6, 7, and 9. In this example, records with the same lexical order numbers are the same record.

After steps 1 and 2 of Procedure 1, i=0 and j=0. Now consider the performance of steps 3 through 5 given the example files of FIG. 6.

As seen in FIG. 6, R_R[0] and T_R[0] are the same record. Hence, in step 3, it is determined that R_R[0]==T_R[0]. As such, an entry with the reference address and length of R_R[0] is added to the COPY-list. Thereafter, both i and j are incremented to 1. Since i is less than the number of reference records N (=7, in this example), and j is less than the number of target records M (=7, in this example), the procedure loops back from step 4 to step 3.

Next, in step 3, it is determined that R_R[1]>T_R[1] (since lexical order number 3>lexical order number 2). As such, an entry with the target record data and length of T_R[1] is added to the ADD-list. Thereafter, i remains at 1, and j is incremented to 2. Since i<N and j<M, the procedure loops back from step 4 to step 3.

Next, in step 3, it is determined that R_R[1]==T_R[2] (both records having the lexical order number 3). As such, an entry with the reference address and length of R_R[1] is added to the COPY-list. Thereafter, i is incremented to 2, and j is incremented to 3. Since i<N and j<M, the procedure loops back from step 4 to step 3.

Next, in step 3, it is determined that R_R[2]<T_R[3] (since lexical order number 4<lexical order number 5). As such, i is incremented to 3, and j remains at 3. No entry is added to either the COPY-list or the ADD-list. Since i<N and j<M, the procedure loops back from step 4 to step 3.

Next, in step 3, it is determined that R_R[3]==T_R[3] (both records having the lexical order number 5). As such, an entry with the reference address and length of R_R[3] is added to the COPY-list. Thereafter, both i and j are incremented to 4. Since i<N and j<M, the procedure loops back from step 4 to step 3.

Next, in step 3, it is determined that R_R[4]==T_R[4] (both records having the lexical order number 6). As such, an entry with the reference address and length of R_R[4] is added to the COPY-list. Thereafter, both i and j are incremented to 5. Since i<N and j<M, the procedure loops back from step 4 to step 3.

Next, in step 3, it is determined that R_R[5]>T_R[5] (since lexical order number 8>lexical order number 7). As such, an entry with the target record data and length of T_R[5] is added to the ADD-list. Thereafter, i remains at 5, and j is incremented to 6. Since i<N and j<M, the procedure loops back from step 4 to step 3.

Next, in step 3, it is determined that R_R[5]<T_R[6] (since lexical order number 8<lexical order number 9). As such, i is incremented to 6, and j remains at 6. No entry is added to either the COPY-list or the ADD-list. Since i<N and j<M, the procedure loops back from step 4 to step 3.

Finally, in step 3, it is determined that R_R[6]==T_R[6] (both records having the lexical order number 9). As such, an entry with the reference address and length of R_R[6] is added to the COPY-list. Thereafter, both i and j are incremented to 7. Since i==N and j==M, the procedure loops moves forward from step 4 to step 5.

In step 5, j==M, so there are no remaining entries to add to the ADD-list. The first stage is then complete. FIG. 6B shows entries in the COPY-list and ADD-list after completion of the first stage in this example.

As seen in FIG. 6, the COPY-list includes the reference address and record length for the records with lexical order numbers 1, 3, 5, 6 and 9, in that order. The ADD-list includes the target record data and record length for the records with lexical order numbers 2 and 7, in that order.

In step 6, the size (in bits) of the sequence S would be the number of entries in the COPY-list (five) plus the number of entries in the ADD-list (two). Hence, the size of S would be seven bits. In this example, S={1, 0, 1, 1, 1, 0, 1}, where a value of 1 indicates that the corresponding record is to be copied from the reference file as indicated by the COPY-list, while a value of 0 indicates that the corresponding record is to be obtained from the ADD-list.

In step 7, a checksum may be computed. The checksum may be over the sequence S, the COPY-list, and the ADD-list. The checksum, sequence S, COPY-list, and ADD-list may then be packed into a single diff (difference) file. Finally, in step 8, digital compression may be applied to reduce the size of the diff file.

Second Procedure (Procedure 2)

In accordance with an embodiment of the invention, if the reference and target files are not sorted in a same manner, and the size of the reference file is less than a first threshold size (Threshold A), then a second procedure (Procedure 2) is applied by the difference engine to generate the difference data between reference and target files. An exemplary second procedure is described below in reference to Table 2.

The second procedure is advantageously configured to achieve a very good compression rate. However, this procedure requires relatively larger memory resources, so it is used for smaller file sizes.

TABLE 2

Input: Sliding hashing window size K; reference file R, reference file length Lr; target file T; and target file length Lt
Output: Compressed diff file
Procedure:
1. Create an empty chaining hash table H. The hash table size can be assigned as the smallest prime number larger than Lr
2. To generate hash records for the first (Lr − K + 1) sub-strings of length K of R based on Karp-Robin hash function:
   a. Calculate the hash value of the $1^{st}$ sub-string R[1,K] (For performance purpose, for example, Horner's rule may be used.)
   b. Slide the window to calculate all other hash values sequentially (To boost performance, for example, an iterative formula may be used.)
   c. Resolving hash collisions by chaining hash records
   d. Each hash record contains the offset of the hashed sub-string
3. Let p = 1
4. If p > Lt − K + 1, go to step 13
5. Calculate the hash value h from the sub-string T[p, p + K − 1]
6. Look up the hash table record H[h].
7. If H[h] is empty, let p = p + 1, go to step 4
8. Let m = 0
9. Walk through all records in the chaining list of H[h] to compare T[p,p + K − 1] with R[s, s + K − 1] where s is the offset of the hashed sub-string of R:
   a. If T[p, p + K − 1] = R[s, s + K − 1], extend the common sub-string forward the longest one with length t. If t > m, let m = t and q = s.
   b. Get next record
10. If m = 0, let p = p + 1 and go to step 4
11. Get a COPY operation as COPY:<p,q,m> and append this operation to the COPY list (C-list).
12. Let p = p + m and go to step 4
13. Use the C-list, the target file length to create the ADD list (A-list) with destination addresses in ascending order. Also form the operation sequence S.
   a. Size of S = size of A-list + size of C-list
   b. S is something like {1, 0, 1, 0, 1, 0, 1, 1} for our example
14. Pack checksum, S, C-list and A-list into diff file.
15. Apply compression algorithm to compress the diff file The above procedure basically has three stages or groups of steps. A first stage of the procedure involves pre-processing the reference file to create a hash table. The first stage corresponds to steps 1 and 2. A second stage involves identifying copy operations with reasonably long sub-string matches based on a "greedy" strategy. The second stage includes steps 3 through 12. Lastly, a third stage packs and encodes the diff file. The third stage corresponds to steps 13 through 15.

Third Procedure (Procedure 3)

In accordance with an embodiment of the invention, if the file size is greater than the first threshold size (Threshold A)

and less than a second threshold size (Threshold B), then a third procedure (Procedure 3) is applied by the difference engine to generate the difference data between reference and target files. An exemplary third procedure is described below in reference to Table 3.

The third procedure is advantageously configured to achieve a reasonably good compression rate but generally not as good as the first and second procedures. Advantageously, the memory resources required by the third procedure is less than that required by the second procedure. This allows the third procedure to be used with larger (intermediate) size files.

TABLE 3

Input: Sliding hashing window size K; reference file R,
reference file length Lr; target file T; and target file length Lt
Output: Compressed diff file
Procedure:
1. Create an empty chaining hash table H. The hash table size may be assigned as the smallest prime number larger than 2*Lr/B where B is the block size. The default block size B = 16.
2. Divide the whole reference file into N blocks with block size B (the last block size may be less than B).
3. For each block from the N blocks, one generates the hash value h from the $1^{st}$ sub-string of length K. If the h-th slot (corresponding to hash value h) of the hash table is empty, set this slot H[h] with the offset, otherwise, do the same for the next offset of the block until the empty slot of the hash table is found and set the empty slot with the offset. (This technique handles hash collisions in a different manner from the conventional xdelta algorithm.) If this block is exhausted without resolving the collision, nothing is done. In a preferredembodiment, a rolling hash function may be utilized to generate the hash values h. For example, the rolling hash function may be a Karp-Rabin rolling hash function.
4. Let p = 1
5. If p > Lt − K + 1, go to step 13
6. Calculate hash value of the sub-string h = T[p, p+K−1]
7. Look up the hash table record H[h].
8. If H[h]is empty, let p = p + 1 and go to step 5
9. If T[p, p + K−1] ≠ R[s, s + K−1] where s = H[h], let p = p + 1 and go to step 5
10. Extend the match of the common sub-strings T[p, p+K−1] and R[s, s+K−1] forward/backward as T[p−b, p+K+f−1] and R[s−b, s+K+f−1]. (Be cautious about the backward match that requires T[p−b, p+K+f−1] does not overlap the latest COPY block in C-list below.)
11. Get a COPY operation as COPY:<p−b, s−b, K+f+b > and append this operation to the COPY list (C-list).
12. Let p = p + f and go to step 5
13. Use the C-list, the target file length to create the ADD list (A-list) in ascending order of destination addresses. Also form the operation sequence S.
    a. Size of S = size of A-list + size of C-list
    b. S is something like {1,0,1,0,1,0,1,1} for our example
14. Pack checksum, S, C-list and A-list into diff file.
15. Apply compression algorithm to diff file The above procedure divides the reference files into blocks and generates a hash value for each block. One difference between the above procedure and the conventional xdelta algorithm is that the above procedure has an improved technique to handle hash collisions.

In accordance with an embodiment of the invention, the hash collisions may be handled as described above in step 3. In particular, hash collisions are not resolved by chaining nor resolved by hash slot overwriting. Instead of chaining, hash collisions are resolved by finding an empty hash slot. This avoids the need for each node of the hash table to have extra memory for pointers to support chaining. Rather, each node advantageously requires less memory because it only needs to store the offset, not any pointers. This capability allows us to process larger reference files. By not overwriting the hash slot with hash collisions, one increases the chances of more COPY operations. This enhancement over xdelta typically improves the compression rate. The improved compression rate is counter-intuitive because not using chaining means that the procedure may be less good at identifying portions of the reference file to copy to the target file. However, the savings in memory by not needing pointers at each node more than makes up for the slightly reduced effectiveness at identifying blocks to copy.

Another difference between the above procedure and the conventional xdelta algorithm is that the above procedure, in its preferred embodiment, utilizes a Karp-Rabin rolling hash function. In contrast, the xdelta algorithm uses an Adler-32 rolling hash function.

Fourth Procedure (Procedure 4)

In accordance with an embodiment of the invention, if the file size is greater than the second threshold size (Threshold B), then a fourth procedure (Procedure 4) is applied by the difference engine to generate the difference data between reference and target files. An exemplary fourth procedure is described below in reference to Table 4. The fourth procedure is advantageously configured to handle very large file sizes despite limited memory resources.

TABLE 4

Summary and Analysis:
  Divide two linearly dependent files into two sequences of "trunks". These two sequences have the same number of trunks, say A[k] and B[k], k = 1, ... ,n.
  All trunk sizes are within a memory usage limit which may be configurable based on available system memory.
  Each B[j] is dependent on A[j] in terms of the diff copy operation --- there is a part (with minimum length) of B[j] that is a copy of partial A[j].
  If j ≠ k, then any part (with minimum length) of B[j] is not a copy of partial A[k].
  The minimum length avoids inefficient actions such as copying several bytes.
Procedure:
  1. Identify the partitions to divide the reference and target files into "trunks" based on the nature of the specific file structure. The partition operation may be performed by a plug-in function in the diff engine.
  2. Adaptively apply the first procedure (Procedure I) or the second procedure (Procedure II) to each pair of the trunks to get S, C-list and A-list for each trunk. For each trunk, the procedure selection (either the first or second procedure) is based according to the trunk size.
  3. Merge all S, C-list and A-list of all trunks into one set of S, C-list and A-list accordingly.

In a first stage, the above procedure identifies partitions appropriate to the specific file structures of the reference and target files and uses those partitions to divide the reference and target files into "trunks". Preferably, each trunk is of a size less than Threshold B. In one implementation, the partition function may be implemented as a plug-in function for the diff engine. Such a plug-in function facilitates updating without need to change the core of the diff engine.

In a second stage, the above procedure adaptively applies either Procedure 2 or Procedure 3 to process each trunk so as to generate an operation sequence S, a copy list (C-list), and an add list (A-list). In particular, for each trunk, Procedure 4 applies either Procedure 2 or Procedure 3 depending on the size of that trunk. For example, if the trunk size is below Threshold A, then Procedure 2 may be applied to process the trunk. On the other hand, if the trunk size is above Threshold A, then Procedure 3 may be applied to process the trunk.

Finally, in a third stage, the operation sequences S are merged for all trunks, the copy lists (C-lists) are merged for all trunks, and the add lists (A-lists) are merged for all trunks. The result is diff data which includes the information needed to reconstruct the target file from the reference file.

Advantageously, diff data for very large files can be generated by Procedure III. This is despite finite limitations of available memory.

Procedure 4 is applicable to file sets which are linearly dependent. A diff engine without memory limitation generates a sequence of COPY instructions as {<destAddr[i], srcAddr[i], len[i]>} with the sequence {<destAddr[i]>} in ascending order. If the array {<srcAddr[i]>} is also in ascending order, then both the reference (src) and target (dest) files are linearly dependent. Now consider a file set {<F1, F2, . . . , Fm >}. If all pairs of files from the set are linearly dependent, then the file set is said to be linearly dependent. (Note that the file set comprising the reference and target files depicted in FIG. 3 is not linearly dependent. This is because, in a sequence of COPY instructions for these files, if the destination addresses are in ascending order, the source addresses are not in ascending order).

Linearly dependent file sets include the file sets in the following example use cases. In a first use case, if all files in a set are sequences of sorted data records with fixed record length, the set of files is a linearly dependent file set. In a second use case, document signature files used in data leakage prevention (DLP) systems may be linearly dependent. In a third use case, virus signature files used by anti-virus (AV) systems may be linearly dependent.

In accordance with an embodiment of the invention, the difference engine is configured to determine (or receive information on) whether or not the reference and target files are linearly dependent. For reference files larger than the second threshold size (Threshold B), if the reference and target files are linearly dependent, then the difference engine may apply Procedure 4. Otherwise, if the target and reference files are not linearly dependent, then the difference engine may apply Procedure 3, although that procedure would be slow (low performance) in generating the diff file.

Merging Procedure

An example merging procedure to reconstruct a target file using a reference file and a difference (or delta) file may be as disclosed below in Table 5.

TABLE 5

Input: Reference file R, reference file length, diff file, diff file size
Output: Target file T
Procedure:
1. Read the diff file
2. Decompress the diff file
3. Validate the checksum and other necessary information
4. Retrieve operation sequence S, C-list and A-list
5. Using the order defined in S, C-list, and A-list and the reference file, reconstruct the target file piece-by-piece based on COPY and ADD operations.

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

What is claimed is:

1. A computer-implemented method for generating difference data between reference and target files, the method being performed using a computer including at least a processor, data storage, and computer-readable instructions, and the method comprising:

receiving the reference file and the target file by a difference engine implemented on the computer; and performing a first procedure by the difference engine to generate difference data representing the difference between the reference and target files if the reference and target files are both sorted according to a same lexical ordering, wherein the first procedure comprises a first stage that identifies copy and add instructions with incremented sequences of sorted records in the reference and target files and a second stage that packs and encodes a first difference file; and performing a second procedure to generate the difference data if the reference and target files are not sorted according to the same lexical ordering and the size of the reference file is less than a first threshold size, wherein the second procedure comprises a first stage that preprocesses the reference file to create a hash table, a second stage that identifies copy operations with substring matches, and a third stage that packs and encodes a second difference file.

2. The method of claim 1, wherein the first procedure comprises:
comparing a record from the reference file against a record from the target file.

3. The method of claim 2, wherein an entry is added to a copy list if said comparing indicates that the reference and target records are the same.

4. The method of claim 3, wherein the entry in the copy list stores a reference address and a length of the record from the reference file.

5. The method of claim 3, wherein an entry is added to an add list if said comparing indicates that a lexical order of the record from the reference file is greater than a lexical order of the record from the target file.

6. The method of claim 5, wherein the entry in the add list stores target record data and a length of the record from the target file.

7. The method of claim 4, wherein no entry is added to either the copy list or the add list if said comparing indicates that the lexical order of the record from the reference file is less than the lexical order of the record from the target file.

8. The method of claim 1, further comprising:
performing a third procedure by the difference engine to generate the difference data if the size of the reference file is less than a second threshold size and greater than the first threshold.

9. The method of claim 8, further comprising:
performing a fourth procedure by the difference engine to generate the difference data if the size of the reference file is greater than the second threshold size.

10. The method of claim 9, wherein the reference and target files are document signature files.

11. The method of claim 9, wherein the reference and target files are computer virus signature files.

12. The method of claim 1, wherein the second procedure pre-processes the reference file to create the hash table using a sliding hash window.

13. The method of claim 8, wherein the third procedure pre-processes the reference file to create a hash table by dividing the reference file into blocks and generating a hash value for each block, and the third procedure resolves hash collisions by finding an empty hash slot.

14. The method of claim 9, wherein the fourth procedure which is performed depends on whether or not the reference and target files are linearly dependent.

15. The method of claim 9, wherein the fourth procedure divides the reference file into a first sequence of trunks and divides the target file into a second sequence of trunks, wherein the first and second sequence have a same number of trunks, and a maximum size of the trunks is within a configurable memory usage limit.

16. A computer apparatus configured to generate difference data between reference and target files, the apparatus comprising:
data storage configured to store computer-readable instruction code and data;
a processor configured to access the data storage and to execute said computer-readable instruction code;
a difference engine implemented on the computer apparatus and comprising computer-readable instruction code configured to
perform a first procedure to generate difference data representing the difference between the reference and target files if the reference and target files are sequences of sorted data records according to a same lexical ordering, wherein the first procedure comprises a first stage that identifies copy and add instructions with incremented sequences of sorted records in the reference and target files and a second stage that packs and encodes a first difference file, and
perform a second procedure to generate the difference data if the reference and target files are not sorted according to the same lexical ordering and the size of the reference file is less than a first threshold size, wherein the second procedure comprises a first stage that pre-processes the reference file to create a hash table, a second stage that identifies copy operations with sub-string matches, and a third stage that packs and encodes a second difference file.

17. The apparatus of claim 16, wherein the computer-readable code is further configured to compare a sorted value of a record from the reference file against a sorted value of a record from the target file.

18. The apparatus of claim 17, wherein the computer-readable code is further configured to add an entry to a copy list if said comparing indicates that the sorted values are equal.

19. The apparatus of claim 18, wherein the entry in the copy list stores a reference address and a length of the record from the reference file.

20. The apparatus of claim 18, wherein the computer-readable code is further configured to add an entry to an add list if said comparing indicates that the sorted value of the record from the reference file is greater than the sorted value of the record from the target file.

21. The apparatus of claim 20, wherein the entry in the add list stores target record data and a length of the record from the target file.

22. The apparatus of claim 20, wherein the computer-readable code is further configured to not add an entry to either the copy list or the add list if said comparing indicates that the sorted value of the record from the reference file is less than the sorted value of the record from the target file.

23. The apparatus of claim 16, wherein the computer-readable code is further configured to perform a third procedure to generate the difference data if the size of the reference file is less than a second threshold size and greater than the first threshold.

24. The apparatus of claim 23, wherein the computer-readable code is further configured to perform a fourth procedure to generate the difference data if the size of the reference file is greater than the second threshold size.

25. The apparatus of claim 24, wherein the reference and target files are document signature files.

26. The apparatus of claim 24, wherein the reference and target files are computer virus signature files.

27. The apparatus of claim 16, wherein the second procedure pre-processes the reference file to create the hash table using a sliding hash window.

28. The apparatus of claim 23, wherein the third procedure pre-processes the reference file to create a hash table by dividing the reference file into blocks and generating a hash value for each block, and the third procedure resolves hash collisions by finding an empty hash slot.

29. The apparatus of claim 24, wherein the fourth procedure which is performed depends on whether or not the reference and target files are linearly dependent.

30. The apparatus of claim 24, wherein the fourth procedure divides the reference file into a first sequence of trunks and divides the target file into a second sequence of trunks, wherein the first and second sequence have a same number of trunks, and a maximum size of the trunks is within a configurable memory usage limit.

* * * * *